United States Statutory Invention Registration [19]

[11] Reg. Number: H868

Daly [43] Published: Jan. 1, 1991

[54] HIGH AVERAGE POWER POCKELS CELL

[75] Inventor: Thomas P. Daly, Pleasanton, Calif.

[73] Assignee: The United States of America as represented by the United States Department of Energy, Washington, D.C.

[21] Appl. No.: 827,703

[22] Filed: Feb. 10, 1986

[51] Int. Cl.[5] ..... G02F 1/03

[52] U.S. Cl. ..... 350/387; 350/389; 350/390; 350/405; 372/33

[58] Field of Search ..... 350/387, 389, 390, 392, 350/405; 372/33

[56] References Cited

U.S. PATENT DOCUMENTS

| | | | |
|---|---|---|---|
| 3,304,428 | 2/1967 | Peters | 350/389 |
| 3,402,002 | 9/1968 | Eden | 350/387 |
| 3,437,399 | 4/1969 | Eden | 350/373 |
| 3,506,929 | 4/1970 | Ballman et al. | 350/387 |
| 3,665,335 | 5/1972 | Tomiyasu | 372/33 |
| 3,770,339 | 11/1973 | Ramaswamy | 350/356 |
| 3,900,247 | 8/1975 | Zaky | 350/385 |
| 4,094,581 | 6/1978 | Baldwin et al. | 350/387 |
| 4,229,079 | 10/1980 | Wayne et al. | 350/356 |
| 4,379,620 | 4/1983 | Erickson | 350/387 |

OTHER PUBLICATIONS

Dianov et al., "Thermal Distortions of Laser Resonators When the Active Rods are in the Form of Rectangular Plates" Sov. Physics–Doklady, 11–1970, pp. 481–482.

Kaminow, I. P., "Strain Effects in Electrooptic Light Modulators" App. Optics, 4–1964, pp. 511–515.

Hook et al., "Lossless KD & P Pockels Cell for High--Power & Switching", App. Optics, 5–1971, pp. 1179–1180.

Vitkov, M. G., "Analysis of the Electric Field Controlling the Longitudinal Electrooptical Effect in Highly Penetrable Anisotropic Crystals with Strip Electrodes" Optics & Spectroscopy, 1968, pp. 420–424.

*Primary Examiner*—Thomas H. Tarcza
*Assistant Examiner*—Linda J. Wallace
*Attorney, Agent, or Firm*—P. Martin Simpson, Jr.; Roger S. Gaither; Judson R. Hightower

[57] ABSTRACT

A high average power pockels cell is disclosed which reduces the effect of thermally induced strains in high average power laser technology. The pockels cell includes an elongated, substantially rectangular crystalline structure formed from a KDP-type material to eliminate shear strains. The X- and Y-axes are oriented substantially perpendicular to the edges of the crystal cross-section and to the C-axis direction of propagation to eliminate shear strains.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH AVERAGE POWER POCKELS CELL

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

The invention relates to a high average power pockels cell for use generally with laser beam propagation applications.

Pockels cells are utilized in the laser art to alter the polarization state of a laser beam which is shined through a crystal. Birefringent crystals can alter the polarization state of laser beams that are shined through them. For example, an initially linearly polarized laser beam may emerge from the crystal elliptically polarized, or it may emerge linearly polarized, but rotated by 90 degrees. In a pockels cell, a voltage is applied across the crystal, creating an electric field $E_v$ inside the crystal, which alters the birefringence of the crystal through the electro-optic effect. The polarization state of the emerging laser beam can then be varied by varying the voltage. Pockels cells are used as polarization switches in beam steering applications and as amplitude modulators. The crystal has special directions related to the directions of the planes of the atoms in the crystal lattice. The orientation of the crystal is specified by the directions of its three mutually perpendicular crystal axes which are called the C, X and Y axes, and which are tied to the crystal lattice. The nature of the pockels effect is that the relative directions of the electric field ($E_v$), the crystal axes (C,X,Y) and the direction of propagation (K) of the laser beam are all quite important. There are many standard designs for pockels cells that are suitable for low average power laser beams.

However, prior art low average power designs are generally not suitable for high average power laser beams because the crystal absorbs some of the laser light, which consequently results in increased temperature. Since the crystal is heated in its middle by the laser beam and cooled on the edges by its supports, the crystal gets hotter in the middle than on the edges. The temperature variation gives rise to various effects which also change the laser's polarization-state independently of the electric field $E_v$. These effects cause the part of the emerging laser beam that propagated near the center of the crystal to have a different polarization state than the part that propagated near the edge of the crystal. Consequently, such variation makes the device relatively useless for most applications. The temperature dependent effects that dominate the degradation are different for the different types of common pockels cell designs in the prior art. Two of the more common effects are thermally induced strains and the temperature dependence of natural birefringence.

Strain is a distortion of the crystal which can be characterized in two classes. In order to understand the two classes, consider an imaginary square inside the crystal with its sides parallel to two of the crystal axes, say X and Y. A tensile-compressive strain is a distortion of the square into a rectangle. The other type of strain is a shear strain which is a distortion of the square into a diamond. A crystal can distort because the hot parts expand more than the cold parts. The strains can alter the polarization state of the laser beam through the strain induced birefringence effect.

Another important effect is the temperature dependence of natural birefringence. Natural birefringence determines the polarization state of the emerging laser beam in the absence of applied voltage or strain. The voltage and strain induced effects add on top of this natural birefringence.

Various approaches have been taken in the prior art for dealing with the problems that arise from the temperature variations that occur in high average power applications. All of these approaches utilize a two-pass pockels cell in which the laser beam goes through two crystals or through the same crystal twice. There are common low average power designs that use both one and two passes, but which, as described above, are unsuitable for high average power application purposes.

The prior art high average power designs may be summarized in the following manner. Upon entering a first crystal, the laser beam splits into a fast and a slow polarization in which the polarization directions and the speed of propagation are dictated by the natural birefringence, the strains and the voltage applied. In between the crystals, the two polarizations are interchanged. The laser beam then goes through a second crystal which is identical to the first crystal in all ways other than the applied voltage. The net result is that all effects on the final polarization state other than the voltage induced effect (and therefore all thermal effects) cancel.

The prior art approach, in general, is not to make the thermal effects in one crystal small, but to make the thermal effects in two separate crystals identical so that they can cancel one another. In principle, these devices null out both of the effects of thermal induced strains and temperature dependence of natural birefringence.

SUMMARY OF THE INVENTION

It is an object of the present invention to provide an improved high average power pockels cell.

It is also an object of the present invention to lessen the effects of shear strain in high average power applications.

It is a further object to decouple the temperature variation and the alteration of the laser polarization state with use of a one-pass device.

The present invention includes an elongated, substantially rectangular crystalline structure formed from a KDP (potassium-dihydrogen-phosphate) type crystal material. The crystal structure is elongated in a C-axis orientation such that the width of the structure along its Y-axis orientation is substantially greater than its height along its X-axis orientation.

A laser beam is propagated in a direction K in a single pass through the crystalline structure where the direction of propagation K and the C-axis are parallel to one another. Before entering the crystal, the laser beam cross-section is made to be long and thin so as to approximately match the X-Y cross-section of the crystal. The improved pockels cell further includes means for applying a voltage across the crystal structure to form an electric field $E_v$ which is oriented in a direction parallel to the direction of propagation (K).

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

DETAILED DESCRIPTION OF THE INVENTION

Reference will now be made in detail to a preferred embodiment of the invention, an example of which is illustrated in the accompanying drawings. While the invention will be described in conjunction with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
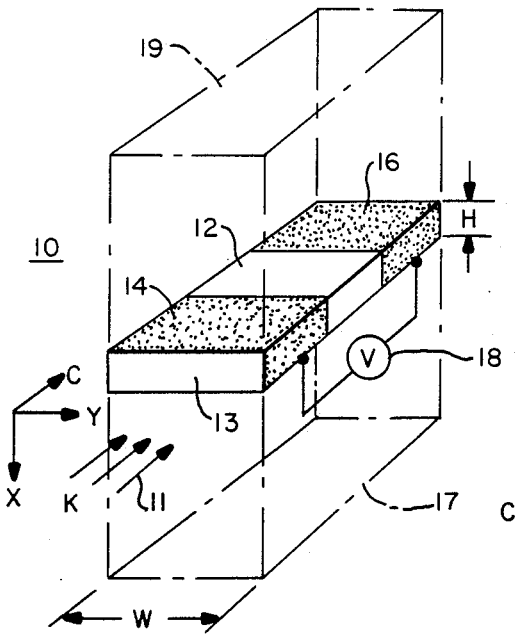
FIG. 1 depicts a perspective view of an improved high average power pockels cell according to the present invention.

Referring now to FIG. 1, a perspective view of an improved high average power pockels cell according to the present invention is depicted. The improved pockels cell 10 is a one-pass device geometrically arranged such as to decouple temperature variation and the alteration of laser polarization state.

In FIG. 1, the improved pockels cell 10 includes an elongated, substantially rectangular crystalline structure 12. Preferably, the crystalline structure 12 is formed from KDP (potassium-dihydrogen-phosphate) or a KDP type material.

As seen in FIG. 1, the crystalline structure 12 is arranged such that a laser beam 11 is propagated in a direction K so as to enter the front face 13 of crystal 12. The laser beam propagation direction K is in the same direction as (parallel to) the C-axis of the crystal, and the C, X and Y axes are oriented as indicated in FIG. 1.

The crystal structure 12 is oriented in the X-Y axes directions such that the width (the Y axis) of crystal 12 is much greater than its height (the X axis). The C length of the crystal 12 along the C-axis is also much greater than the height along the X-axis. The respective ratios of length/height and width/height are both on the order of 10:1. The crystalline structure is consequently thin and in addition has electrodes 14, 16 oriented along the periphery or respective ends of the crystalline structure 12. In FIG. 1, electrode 14 is "painted" along the "front" periphery 13 of crystal 12. Electrode 16 is painted along the "rear" periphery of crystal 12. The entire structure is "sandwiched" between two electrically insulating heat sinks 17, 19 along its top and bottom surfaces (those surfaces which are perpendicular to the X axis). This will ensure that the primary direction of heat flow is always the X axis. The length of each electrode 14, 16 along the C-axis is on the order of one-third the length of the pockels cell 10.

A voltage source 18 applies a voltage to electrodes 14, 16 such that an electric field $E_v$ is oriented in a direction parallel to the direction of propagation (K) of the laser beam 11 and in addition parallel to the C axis orientation.

When the C and K axes are parallel, as in FIGS. 1–4, there is no natural birefringence, so the thermal effect of temperature dependence of natural birefringence is eliminated.

Figure 2:
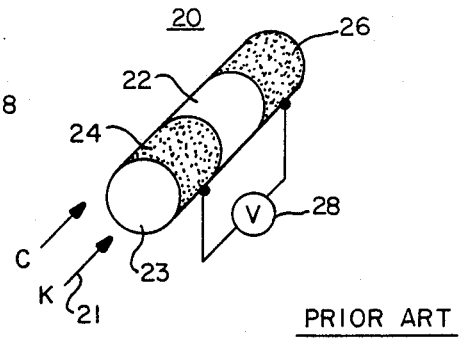
FIGS. 2 and 3 depict prior art designs of pockels cells.
Figure 3:
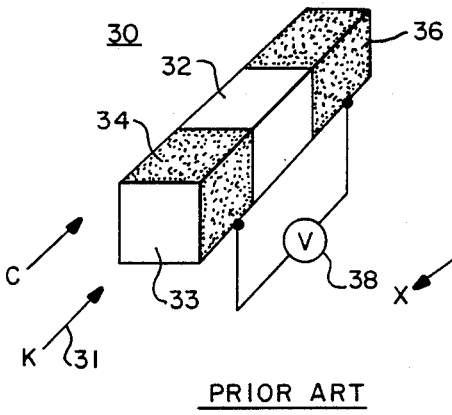

The effect of thermal induced strains in the improved high average power pockels cell according to the present invention can be compared with old low average power devices as depicted in FIGS. 2 and 3.

In FIG. 2, one prior art design of a low average power pockels cell 20 is depicted in which a crystalline structure 22 is formed in a cylindrical manner rather than as a substantially rectangular elongated structure. The crystalline structure 22 is a KDP type material, and the electric field $E_v$ as applied by voltage source 28 to electrodes 24, 26 is parallel to the direction of propagation of the laser beam 21, and in addition parallel to the C axis.

FIG. 3 depicts a low average power pockels cell 30 having a crystalline structure 32 which is substantially square. A voltage source 38 applies a voltage to electrodes 34, 36 such that the electric field $E_v$ is parallel to the direction of propagation of the laser beam 31 and in addition parallel to the C axis.

It can be shown that the pockels cells illustrated in FIGS. 2 and 3 have average power limitations placed by thermal induced strains. One particular type of shear strain (which is commonly referred to as $\epsilon_6$ and which is a distortion of the angle between the X and Y crystal axes away from 90 degrees) effects the polarization state of the laser light much more strongly than the other types of strain that are present. However, the prior art approach has not suggested techniques for lessening the effects of the strain.

FIG. 1 is geometrically oriented such that the heat flow and the resulting temperature variation produces strains but it is not believed to produce the shear strain $\epsilon_6$. Consequently, the improved pockels cell of FIG. 1 should be able to handle higher average powers than the pockels cells depicted in FIGS. 2 and 3.

Figure 4:
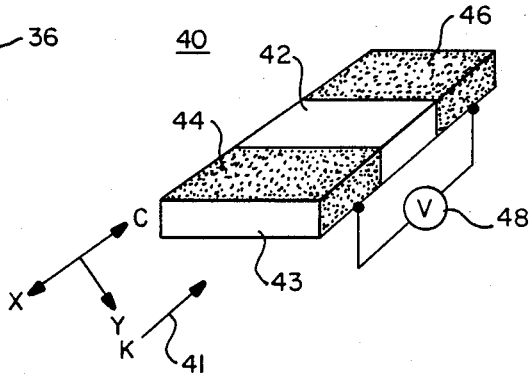
FIG. 4 depicts a perspective view of a further variation of a pockels cell.

To see how the design of FIG. 1 eliminates $\epsilon_6$ and to estimate the size of the improvement in the average power handling capabilities, consider FIG. 4. FIG. 4 differs from FIG. 1 only in that the X and Y crystal axes are rotated about the C axis by 45 degrees. That is, the slab in FIG. 4 is cut out of the same "as grown" crystal boule in a different orientation than the slab in FIG. 1.

Consider a rectangular cross-section perpendicular to the C-axis of the crystal slabs in FIGS. 1 and 4. While the crystals are in a cool state, with no laser beam shining through them, consider these cross-sections to be divided into small imaginary squares with sides parallel to the edges of the cross-sections. Now shine laser beams of a given average power through the crystals. Consider how the imaginary squares distort as the laser beams heat up the crystals.

It is possible to calculate the temperature variations inside the slabs due to laser beam heating and to estimate from this temperature variation, using the theory of elasticity, the distortions (or strains) that these imaginary squares undergo as the crystal heats up. The result of such a calculation is that the squares distort into rectangles (with sides parallel to the edges of the cross-section) in both FIG. 1 and FIG. 4, and that the size of the distortions (or strains) in FIGS. 1 and 4 are comparable, that is, within a factor or two of each other. Such distortions will obviously change the angle between the X and Y crystal axes in FIG. 4, but not in FIG. 1. Therefore, the strain $\epsilon_6$ is present in FIG. 4 but not in FIG. 1. Since FIG. 1 eliminates the most detrimental type of strain, $\epsilon_6$, it can be said to decouple the thermally induced strains from the laser beam polarization.

Using commonly known values of the elasto optic constants of KDP, one may calculate from the above calculated strains the size of the effect on the laser beam's polarization state. This calculation indicates that the average power limit due to thermally induced strains may be 100 times larger for the pockels cell of FIG. 1 than for FIG. 4. (This result applies to pockels cells used for polarization switches in beam steering applications.) The calculation indicates that the pockels cell of FIG. 1, using a KDP crystal, may be usable with a 3 KW average power visible laser beam.

The designs of FIGS. 2 and 3 also give rise to the strain $\epsilon_6$. Therefore the highest tolerable average power for FIG. 1 should also be much higher than that for FIGS. 2 and 3.

A further feature of the geometrical orientation (slab geometry) of FIG. 1 is that the temperature variation, and therefore the strains, tend to be small since heat is taken out efficiently.

The improved pockels cells depicted in FIG. 1 can be manipulated to get rid of or eliminate most of the detrimental type of thermally induced strains.

In the preferred embodiment of the present invention, the crystalline type material is formed from a KDP type material and the C axis, electric field and direction of propagation of the laser beam are parallel to one another. This eliminates the strong temperature dependence of natural birefringence.

The crystalline structure utilized in the preferred embodiment is formed from an elongated substantially rectangular type of crystalline KDP material. This forms a thin slab which is long and thin and which is sandwiched between heat sinks to eliminate shear strains and lower the change in temperatures. The X and Y axes are oriented as illustrated in FIG. 1 to eliminate shear strains.

Finally, the electrodes are arranged at the respective ends or periphery of the rectangular crystalline structure so as to provide a uniform electric field $E_y$.

The foregoing description of a preferred embodiment of the present invention has been presented for purposes of illustration and description. It is not intended to be exhaustive or to limit the invention to the precise form disclosed. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high average power pockels cell comprising an elongated, substantially rectangular crystalline structure formed from a KDP (potassium-dihydrogen-phosphate) type crystal material, said crystalline structure being elongated in a C-axis orientation and having its height and width oriented parallel to the X and Y crystal axes and where the width of said crystalline structure along said Y axis and the length of said crystal along said C-axis, respectively, are substantially greater than its height along said X-axis, and wherein said crystalline structure includes electrodes formed at the respective front and back ends of said elongated structure, means for propagating a high average power laser beam in a single pass in said C-axis direction through said crystalline structure such that the laser beam cross-section approximately matches the crystal cross-section, means for applying voltage across said crystalline structure at said electrodes to form an electric field oriented in a direction parallel to said direction of propagation, and means for removing heat from said crystalline structure through heat sinks along the surfaces perpendicular to the X-axis such that the direction of heat flow is primarily parallel to the X-axis so as to eliminate the thermal effect of temperature dependence of natural birefringence and to reduce or eliminate shear strains.

2. A high average power pockels cell comprising a crystalline structure including an elongated, substantially rectangular structure, said structure elongated in a C-axis orientation and having its height and width oriented parallel to the X and Y crystal axes and where the width of said crystalline structure along said Y axis and the length of said crystalline structure along said C axis, respectively, are substantially greater than its height along said X axis, and wherein said crystalline structure includes electrodes formed at the respective front and back ends of said elongated structure and including means for applying said voltage to said respective electrodes, means for propagating a high average power laser beam having a certain polarization in a single pass through said crystalline structure, means for applying a voltage across said structure at said electrodes, and means for removing heat from said structure so as to decouple thermally induced strains from the laser beam polarization.

3. A pockels cell as in claim 2 wherein said crystalline structure is formed from a KDP (potassium-dihydrogen-phosphate) type crystalline material.

* * * * *